3,455,940
Patented July 15, 1969

1

3,455,940
CERTAIN HALO AND DIHALO N-SUBSTITUTED SALICYLAMIDES
Herbert C. Stecker, 1 Bridle Way,
Ho-Ho-Kus, N.J. 07423
No Drawing. Filed Dec. 7, 1965, Ser. No. 512,598
Int. Cl. C07c *103/26;* C07d *31/44, 7/04*
U.S. Cl. 260—295        5 Claims

ABSTRACT OF THE DISCLOSURE

New compounds, possessing high germicidal power and little or no tendency to cause discoloratioin in light, are claimed, having the general formula:

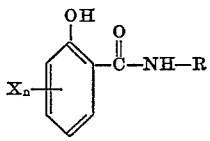

in which R is a methylene, ethylene or propylene group to which is attached 1 to 3 ring nuclei containing from 0 to 2 halogen atoms directly attached, said R containing not over 20 carbon atoms, and $n$ is a numeral from 0 to 2, except when R is methylbenzene, in which case $n$ is 1 to 2.

---

This invention deals with new organic chemical compounds in the salicylamide class which have exceptionally high germicidal effectiveness, and which have little or no tendency to cause discoloration in presence of light, within a reasonable period of time. More specifically, it relates to compounds having the general formula:

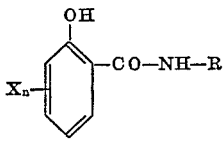

wherein:

R is a substituted methylene group to which is attached hydrogen, alkyl, aryl, alkaryl, aralkyl or heterocyclic groups, said R having a total of not over 20 carbon atoms,
X is hydrogen, halogen, trifluoromethyl, or nitro, and
$n$ is a numeral from 0 to 2, except when R is methylbenzene, when $n$ is then 1 to 2.

The groups representing R may have polar substituents, such as halogen, hydroxy, silane, ethoxysilane, ether, amino, and the like. The methylene group may have attached to it one or two substituent groups, one or both of which may be alkyl, aryl, alkylaryl, ethenol, and the like.

Of particular value for the purposes of the present invention, are compounds in which R contains a methylene, ethylene or propylene group to which is attached a single ring nucleus which may contain up to two halogen atoms attached thereto. Another effective group of compounds consists of those in which R has a methylene, ethylene or propylene group to which is attached a radical containing a free amino group.

The compounds may be prepared by the following method, which is given as an example:

3,5-dibromosalicyl-N-4-chlorobenzylamide

Molal quantities of 3,5-dibromosalycylic acid are reacted in presence of phosphorus trichloride to produce 3,5-dibromosalicyl chloride. When reaction is complete, an equimolar amount of 4-chlorobenzylamine is added, and the mixture is heated until hydrogen chloride fumes

2 cease to be evolved. This reaction is carried out in an inert solvent or suspension agent, such as chlorobenzene. After reaction is complete, the product is isolated by evaporation of the solvent, suspending the residue in water, filtering, redissolving or suspending the filter cake in alcohol and re-filtering, using the last procedure three times to insure the removal of byproducts and residue of unreacted intermediates.

Table I lists a number of compounds of the present invention prepared in accordance with the aforesaid process. Reacted with the particularly-substituted salicyl chloride, are the following reactants, listed in the numerical order given in the table:

(1) 4-chlorobenzylamine.
(2) Benzylamine.
(3) Benzylamine.
(4) 4-chlorobenzylamine.
(5) Alpha-(1-aminoethyl)-p-hydroxybenzyl alcohol.
(6) Ethanolamine.
(7) Propylamine.
(8) 1-(beta aminoethyl)-2-imidazolidone.
(9) N-(2-aminoethyl) indole.
(10) 1-(B-aminoethyl)-2-methyl-2-imidazoline.
(11) N-(2-aminoethyl) morpholine.
(12) N-(2-aminoethyl) piperazine.
(13) 2-(2-aminoethyl) pyridine.
(14) N-(2-aminoethyl) pyrrolidine.
(15) 4-aminomethyl-1-benzyl-4-phenylpiperidine.
(16) 5-aminolevulinic acid.
(17) 2-aminomethylbenzimidazole.
(18) Endo-2-aminomethylbicyclo (2.2.1) heptane.
(19) Phenethylamine.
(20) 2,4-dichlorobenzylamine.
(21) 3,4-dichlorobenzylamine.
(22) O-chlorobenzylamine.
(23) p-Chlorobenzylamine.
(24) 2,4-dimethyl benzylamine.
(25) p-Fluorobenzylamine.
(26) m-Methylbenzylamine.
(27) 1-naphthalene methylamine.
(28) 4-aminomethylpyridine.
(29) 3-aminomethylpyridine.
(30) 2-aminomethylpyridine.
(31) 4-aminomethyl piperidine.
(32) 2-aminomethyl tetrahydropyran.
(33) 2-aminomethyl-3,4-dihydro-2H-pyran.
(34) N-(3-aminopropyl) diethanolamine.
(35) N-(Y-aminopropyl)-N'-methylpiperazine.
(36) N-(3-aminopropyl) morpholine.
(37) N-(3-aminopropyl) piperidine.
(38) 3-aminopropyl triethoxysilane.
(39) 5-benzyloxytryptamine.
(40) N,N'-bis-(3-aminopropyl) piperazine.
(41) N,N'-bis-(3-aminopropyl) piperazine.
(42) 6-fluoro-alpha-methyltryptamine.
(43) Furfurylamine.
(44) Histamine.
(45) Homotryptamine.
(46) B-(3,4-methylenedioxyphenyl) isopropylamine.
(47) N-(4-picolyl) ethylenediamine.
(48) Piperonylamine.
(49) Tetrahydrofurfurylamine.
(50) n-Nonylamine.
(51) 1,6-hexanediamine.
(52) 1,6-hexanediamine.
(53) m-Xylylenediamine.
(54) m-Xylylenediamine.
(55) 2-(p-tolyl) ethylamine.
(56) 1,4-bis-(aminomethyl) cyclohexane.
(57) 1,4-bis(3,5-dibromosalicylaminomethyl) cyclohexane.

(58) p-(2-aminopropyl) phenol.
(59) 1-amino-2,3-propanediol.
(60) 2-amino-3,3-dimethylbutane.
(61) Aminodiphenylmethane.
(62) 1-amino-1,2-diphenylmethane.
(63) 3-aminoheptane.
(64) 2-(2'-thienyl) ethylamine.
(65) Benzylamine.

TABLE I

| No. | X | R | Nitrogen Calc. | Nitrogen Found | M.I.C., p.p.m., S. aureus |
|---|---|---|---|---|---|
| 1 | | —CH$_2$—C$_6$H$_4$—Cl | 5.33 | 5.32 | 0.10 |
| 2 | 3,5-dibromo | —CH$_2$—C$_6$H$_5$ | 3.64 | 3.64 | 0.10 |
| 3 | 5-bromo | —CH$_2$—C$_6$H$_5$ | 4.58 | 4.57 | 0.10 |
| 4 | 3,5-dibromo | —CH$_2$—C$_6$H$_4$—Cl | 3.34 | 3.33 | 0.01 |
| 5 | do | —CH(CF$_3$)CHOH—C$_6$H$_4$—OH | 2.60 | 2.61 | 0.05 |
| 6 | 3,5-diiodo | —CH$_2$—CH$_2$OH | 3.23 | 3.23 | 0.02 |
| 7 | do | —CH$_2$—CH$_2$—CH$_3$ | 3.25 | 3.26 | 0.02 |
| 8 | 5-iodo | —CH$_2$—CH$_2$—N(hydantoin) | 11.20 | 11.18 | 0.02 |
| 9 | 5-chloro | —CH$_2$—CH$_2$—N(indolinyl) | 8.89 | 8.86 | 0.02 |
| 10 | 3,5-dichloro | —CH$_2$—CH$_2$—N(4-methyl-imidazolinyl) | 13.28 | 13.25 | 0.05 |
| 11 | | —CH$_2$—CH$_2$—N(morpholinyl) | 11.19 | 11.18 | 0.05 |
| 12 | | —CH$_2$—CH$_2$—N(piperazinyl) | 16.85 | 16.83 | 0.05 |
| 13 | 5-bromo | —CH$_2$—CH$_2$—(2-pyridyl) | 8.72 | 8.71 | 0.02 |
| 14 | 3,5-dibromo | —CH$_2$—CH$_2$—N(pyrrolidinyl) | 7.14 | 7.15 | 0.02 |
| 15 | do | —CH$_2$—(4-phenyl-1-benzylpiperidinyl) | 5.02 | 5.02 | 0.04 |
| 16 | do | —CH$_2$—C(O)—CH$_2$—CH$_2$—COOH | 3.42 | 3.41 | 0.05 |
| 17 | do | —CH$_2$—(benzimidazolyl) | 9.88 | 9.07 | 0.02 |
| 18 | do | —CH$_2$—(norbornyl) | 3.47 | 3.47 | 0.05 |
| 19 | do | —CH$_2$—CH$_2$—C$_6$H$_5$ | 3.51 | 3.50 | 0.02 |

TABLE I—Continued

| No. | X | R | Nitrogen Calc. | Nitrogen Found | M.I.C., p.p.m., S. aureus |
|---|---|---|---|---|---|
| 20 | 3,5-dibromo | —CH₂—(2,5-dichlorophenyl) | 3.08 | 3.08 | 0.01 |
| 21 | do | —CH₂—(2,4-dichlorophenyl) | 3.07 | 3.07 | 0.01 |
| 22 | do | —CH₂—(2-chlorophenyl) | 3.34 | 3.35 | 0.01 |
| 23 | do | —CH₂—(4-chlorophenyl) | 3.34 | 3.35 | 0.01 |
| 24 | do | —CH₂—(2,5-dimethylphenyl) | 3.39 | 3.38 | 0.02 |
| 25 | 4—CF₃ | —CH₂—(4-fluorophenyl) | 4.47 | 4.47 | 0.04 |
| 26 | 3-bromo-5-chloro | —CH₂—(3-methylphenyl) | 3.95 | 3.94 | 0.03 |
| 27 | 4—CF₃ | —CH₂—(naphthyl) | 4.06 | 4.05 | 0.10 |
| 28 | 4—CF₃ | —CH₂—(4-pyridyl) | 9.46 | 9.44 | 0.10 |
| 29 | 5-bromo | —CH₂—(2-pyridyl) | 9.12 | 9.12 | 0.10 |
| 30 | 3,5-dibromo | —CH₂—(2-pyridyl) | 7.25 | 7.26 | 0.02 |
| 31 | 3,5-dichloro | —CH₂—(piperidyl-NH) | 9.23 | 9.21 | 0.02 |
| 32 | | —CH₂—(tetrahydropyranyl) | 3.88 | 3.87 | 0.05 |
| 33 | 5-chloro | —CH₂—(tetrahydropyranyl) | 5.23 | 5.23 | 0.05 |
| 34 | 3,5-dibromo | —CH₂—CH₂—CH₂—N(CH₂—CH₂OH)₂ | 6.36 | 6.35 | 0.05 |
| 35 | do | —CH₂—CH₂—N(piperazinyl)N—CH₃ | 9.65 | 9.63 | 0.10 |
| 36 | do | —CH₂—CH₂—CH₂—N(morpholinyl) | 6.63 | 6.61 | 0.10 |
| 37 | do | —CH₂—CH₂—CH₂—N(piperidyl) | 6.67 | 6.67 | 0.10 |
| 38 | do | —CH₂—CH₂—CH₂—Si(OC₂H₅)₃ | 2.01 | 2.02 | 0.15 |
| 39 | do | —CH₂—CH₂—(5-phenoxymethyl-indolyl) | 5.14 | 5.13 | 0.10 |
| 40 | do | —CH₂—CH₂—CH₂—N(piperazinyl)N—CH₂—CH₂—CH₂—NH₂ | 8.78 | 8.76 | 0.10 |

TABLE I—Continued

| No. | X | R | Nitrogen Calc. | Nitrogen Found | M.I.C., p.p.m., S. aureus |
|---|---|---|---|---|---|
| 41 | 3,5 dibromo | —CH₂—CH₂—CH₂—N(piperazine)N—CH₂—CH₂—CH₂—NH—C(=O)—(2-OH,3-Br,5-Br-phenyl) | 7.41 | 7.39 | 0.02 |
| 42 | do | —CH₂—CH(CH₃)—(5-fluoroindol-3-yl) | 5.96 | 5.95 | 0.02 |
| 43 | do | —CH₂—(furan-2-yl) | 3.73 | 3.74 | 0.02 |
| 44 | do | —CH₂—CH₂—(imidazol-1-yl) | 10.80 | 10.78 | 0.02 |
| 45 | do | —CH₂—CH₂—CH₂—(indol-3-yl) | 6.19 | 6.19 | 0.04 |
| 46 | do | —CH₂—CH₂—(3,4-methylenedioxyphenyl) | 3.06 | 3.05 | 0.04 |
| 47 | do | —CH₂—CH₂—NH—CH₂—(piperidin-4-yl) | 9.79 | 9.77 | 0.03 |
| 48 | do | —CH₂—(1,4-benzodioxan-2-yl) | 3.26 | 3.25 | 0.03 |
| 49 | do | —CH₂—(tetrahydrofuran-2-yl) | 3.70 | 3.69 | 0.02 |
| 50 | do | —CH₂—(CH₂)₇—CH₃ | 3.33 | 3.33 | 0.05 |
| 51 | do | —CH₂—(CH₂)₅—NH₂ | 7.11 | 7.10 | 0.05 |
| 52 | do | —CH₂—(CH₂)₅—NH—C(=O)—(2-OH,3-Br,5-Br-phenyl) | 4.17 | 4.17 | 0.02 |
| 53 | do | —CH₂—(phenyl)—CH₂—NH₂ | 6.76 | 6.75 | 0.05 |
| 54 | do | —CH₂—(cyclohexyl)—CH₂—NH—C(=O)—(2-OH,3-Br,5-Br-phenyl) | 4.04 | 4.05 | 0.04 |
| 55 | do | —CH₂—CH₂—(4-methylphenyl) | 3.39 | 3.39 | 0.10 |

TABLE I—Continued

| No. | X | R | Nitrogen Calc. | Nitrogen Found | M.I.C. p.p.m., S. aureus |
|---|---|---|---|---|---|
| 56 | 3,5-dibromo | —CH$_2$—C$_6$H$_4$—CH$_2$—NH$_2$ | 6.67 | 6.66 | 0.10 |
| 57 | do | —CH$_2$—C$_6$H$_4$—CH$_2$—NH—C(O)—(2-OH,3,5-diBr-C$_6$H$_2$) | 4.01 | 4.00 | 0.05 |
| 58 | 3-nitro | —CH(CH$_3$)—CH$_2$—C$_6$H$_4$—OH | 8.82 | 8.80 | 0.01 |
| 59 | 5-bromo | —C(H)(OH)—CH$_2$OH | 4.83 | 4.84 | 0.01 |
| 60 | 5-chloro | —C(H)(CH$_3$)—C(CH$_3$)$_3$ | 5.47 | 5.48 | 0.05 |
| 61 | | —CH(C$_6$H$_5$)—C$_6$H$_5$ | 4.61 | 4.60 | 0.15 |
| 62 | | —C(H)(CH$_2$—C$_6$H$_5$)—C$_6$H$_5$ | 4.41 | 4.41 | 0.15 |
| 63 | 3,5-dichloro | —C(H)(CH$_2$—CH$_3$)—(CH$_2$)$_3$—CH$_3$ | 4.60 | 4.61 | 0.10 |
| 64 | 3,5-dibromo | —CH$_2$—CH$_2$—(2-thienyl) | 3.46 | 3.45 | 0.05 |
| 65 | | —CH$_2$—C$_6$H$_5$ | — | — | 10.00 |

It will be noted that Table I lists, first, the numerical order of the compounds. The second listing is the substituent X, which is the substituent in the salicyl portion of the molecule of the generic formula given. Absence of any listing indicates that the nucleus is unsubstituted. The third column of the table designates the portion R of the generic formula. The fourth and fifth columns of the table specify the percentage of nitrogen as calculated and as actually found in the reaction product, which is the subject of the present invention.

The sixth column of the table specifies the germicidal effectiveness of the compound against S. aureus, as the minimum inhibitory concentration, in parts per million. This was determined as follows:

Ten milligrams of each compound were dissolved in 1000 ml. of nutrient broth adjusted to pH 6.8. From each such dilution, 10 ml. dilutions were prepared in sterile broth varying in strength between 10 p.p.m. and 0.2 p.p.m., utilizing 20 tubes for each compound. Each dilution was inoculated with 0.1 ml. of a 24-hour-old broth culture of S. aureus, and all tubes were read for density on a densitometer, and the values recorded. A control broth was inoculated. All tubes were inoculated at 37° C. for exactly 24 hours. Following inoculation, all tubes were re-read in the densitometer and, since growth of the organism creates turbidity, the higher the densitometer reading, the greater the growth. A turbidometric reading equal to that of the control would indicate no activity of the compound. A reading equal to that prior to incubation indicates 100% activity of the compound. The above results show the concentration at which increase in densitometer reading was observed.

Compound 65, although not encompassed by the invention, is included for the purpose of comparison, to show its germicidal ineffectiveness, when compared to the compounds claimed herein.

The compounds of the present invention have been found effective against micro-organisms, such as bacteria, fungi, and the like, such as A. niger, E. coli, S. typhi, L. casei, S. choleraesuis, and the like.

One of the disadvantages of present phenolic germicides is their tendency to discolor in the presence of light, particularly in presence of soaps and on light colored fabrics and in cosmetics. This discoloration has been attributed to the phenolic group. Yet, attempts to circumvent this coloration problem, while still retaining the phenolic hydroxyl group, have not proved successful. According to the present invention, it has been possible to product very effective germicides while retaining the phenolic salicyl group and amide structure and yet inhibit discoloration in light thereby for a reasonable period of time. The compounds of the present invention appear to accomplish this effect by reducing the possibility of formation of double bonds thought to be responsible for the undesirable color development.

When the compounds of the present invention are incorporated in germicidally-effective amounts in soap or detergent compositions, such as toilet bars, for example, a very high degree of effectiveness against micro-organisms is obtained. Furthermore, when the light-colored bar is exposed to sunlight, color development is considerably reduced or virtually eliminated for a reasonably long period of time. When the present compounds are applied to white or light-colored textile fabrics, the same advantages are realized, thus minimizing the necessity of using optical bleaches or other artificial means for offsetting discoloration.

A further and very distinct advantage in employing the compounds of the present invention, particularly in contact with the skin, is the fact that, upon hydrolysis, they do not form aniline or substituted anilines, which have been found to produce methemoglobemia and other undesirable physiological effects in some cases.

Table II lists experimental data obtained on the germicidal effectiveness of the compounds of the present invention when applied to fabrics such as cotton, nylon and wool. The germicidal compounds were dissolved in 50% alcohol at a concentration of 0.10% with 0.02% of a nonionic detergent (sold commercially under the tradename of "Igepal CO-630"). The test fabrics were immersed in the solution momentarily, after which they were dried and a disk thereof was placed on nutrient agar seeded with S. aureus and incubated at 37° C. for 24 hours.

TABLE II

| Germicide | Zone of Inhibition, mm. | | |
|---|---|---|---|
| | Cotton | Nylon | Wool |
| 3,5-dibromosalicyl-N-4 chlorobenzylamide | 10.0 | 7.5 | 11.0 |
| 3,5-dibromosalicyl-N-phenethylamide | 9.5 | 7.0 | 9.5 |
| 5-iodosalicyl-N-2-aminomethyltetrahydropyran. | 10.5 | 9.0 | 11.0 |
| 4-trifluoromethylsalicyl-N-4-aminomethylpyridine. | 9.0 | 8.5 | 9.5 |
| 3-5-diiodosalicyl-N-2-aminoethanol | 12.5 | 8.5 | 12.5 |

The aforesaid white textiles treated with the aforesaid germicidal compounds showed little or no discoloration at the time of application, and did not exhibit any change in color after exposure to sunlight when compared with textiles containing the same amount of conventional phenolic germicides, exposed to the same light for the same period.

Tests were also performed on compounds of the present invention in soap compositions applied to fresh calfskin, and the superior results obtained are summarized in Table III.

TABLE III

Germicide: Zone of inhibition, mm.
Salicyl-N-4-chlorobenzylamide _____ 5.0
3,5-dibromosalicyl-N-4-aminomethyl-1-benzyl-4-phenylpiperidine _____ 6.0
5-bromosalicyl-N-2-(2-aminoethyl) pyridine _____ 5.0
4-trifluoromethylsalicyl-N-4-fluorobenzylamide ___ 5.0
5-chlorosalicyl-N-2-aminomethyl-3,4-dihydro-2H-pyran _____ 5.5
3,5-dibromosalicyl piperonylamide _____ 6.0
Bis(3,5-dibromosalicyl)-1,6-hexanediamide _____ 6.5

The skin substantivity (leaching) tests were conducted by applying aqueous solutions containing 5.0% by weight of "Ivory" brand neutral white, high-grade, tallow toilet soap which, in turn, contained 0.5% by weight (based on the soap) of the germicidal compounds of the present invention to fresh calfskin, and self-injecting the treated skin to clear water leaching for 3 minutes. The skin disks then were placed on nutrient agar seeded with S. aureus, and incubated at 37° C. for 24 hours. All tests were conducted in triplicate. It will be noted from Table III that the compounds exhibited a high degree of substantivity.

Further, white soap bars made with 0.5% of the above-identified germicides of Table III showed little or no discoloration after exposure to sunlight when compared with soap bars containing the same a mount of conventional phenolic germicides, exposed to the same light for the same period.

The compounds of the present invention are useful in compositions comprising germicidally inert material, i.e., relatively speaking. For example, some soaps and detergents possess a bactericidal action, but such action, relative to those of the compounds of the present invention, is weak and activity of the composition. In such compositions, the compounds of the present invention may be employed in concentrations as low as 10 p.p.m., although, from a practical point of view, it is desirable to use as much as 50 p.p.m. or 0.001% by weight, or 0.01%, and as much as 0.1%, or more. The term "germicidal activity" includes inhibiting and killing action against bacteria, fungi and similar organisms.

Particularly useful compositions of the present invention are those comprising soaps and detergents, and especially toilet soaps or cosmetic detergents in which the compounds of the present invention may be employed in concentrations of 0.1% to 0.5% by weight, or even as much as 1% or more. The term "detergent" employed herein will be used to include all synthetic and natural cleansing compositions, including cationic detergents, such as dimethyl stearamido-propyl-2-hydroxy-ammonium dihydrogen phosphate, anionic detergents such as commercial soaps, e.g., alkali metal soaps of hydrolyzed natural or synthetic glycerides of fatty and similar organic acids, e.g., sodium and potassium stearates or oleates, ampholytic detergents, such as sarcosine, non-ionic detergents such as polyoxypropylene polyoxethylene condensates, natural detergents, such as starches, vegetable gums, and the like, and mixtures thereof. The term "soap" employed herein is used in its popular or ordinary meaning, i.e., a cleansing composition prepared from an alkali metal compound such as potassium or sodium hydroxide and a fat or fatty acid, both saturated and unsaturated.

One valuable use of the compounds of the present invention is the use thereof to sanitize fibrous material such as cotton gauze, dressings, textiles, paper pulp, and the like. They also serve as antiseptic agents when incorporated in plastic or rubber compositions, prior to molding into articles of commerce, such as baby rattles, gloves, food wrappers and the like.

I claim:

1. A compound having the formula:

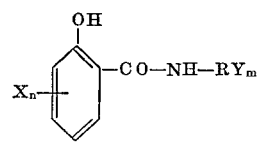

in which:

X is a halogen or trifluoromethyl group, $n$ is 1 or 2,

R is a radical of the class consisting of benzyl, tetrahydropyranyl methyl, pyridyl methyl, and betahydroxyethyl, Y is hydrogen, methyl, or chlorine, and $m$ is 0, 1, or 2.

2. N-(4-halobenzyl)-3,5-dihalo-salicylamide.
3. 5-halo, N-tetrahydropyranylmethyl-salicylamide.
4. 3,5-dihalo, N-hydroxyethyl-salicylamide.
5. Trifluoromethyl, N-pyridyl-4-methyl-salicylamide.

References Cited

UNITED STATES PATENTS

| | | | |
|---|---|---|---|
| 2,703,332 | 3/1955 | Riehen et al. | 260—559 |
| 2,861,916 | 11/1958 | Model et al. | 260—559 |
| 2,967,885 | 1/1961 | Lamberti | 260—559 |

FOREIGN PATENTS 554,530  1/1960  Belgium.

HENRY R. JILES, Primary Examiner

ALAN L. ROTMAN, Assistant Examiner

U.S. Cl. X.R.

252—106, 117, 152; 260—247.2, 268, 294, 295.5, 309, 309.2, 309.6, 326.13, 326.3, 332.2, 340.5, 345.7, 347.3, 448.8, 519, 559; 424—262, 263, 266, 267, 274, 282, 283, 285, 324